(12) United States Patent
Yamauchi et al.

(10) Patent No.: US 9,688,235 B2
(45) Date of Patent: Jun. 27, 2017

(54) IGNITER, IGNITER ASSEMBLY, AND DETECTION SYSTEM AND DETECTION METHOD THEREFOR

(71) Applicants: Hitachi Systems, Ltd., Tokyo (JP); Daicel Corporation, Osaka-shi, Osaka (JP)

(72) Inventors: Shigeru Yamauchi, Tokyo (JP); Kenichiro Tomoi, Tokyo (JP); Takaaki Yui, Tokyo (JP); Toshiyuki Sakai, Tatsuno (JP); Shingo Oda, Tatsuno (JP)

(73) Assignees: HITACHI SYSTEMS, LTD., Tokyo (JP); DAICEL CORPORATION, Osaka (JP)

( * ) Notice: Subject to any disclaimer, the term of this patent is extended or adjusted under 35 U.S.C. 154(b) by 0 days.

(21) Appl. No.: 14/777,931

(22) PCT Filed: Mar. 18, 2013

(86) PCT No.: PCT/JP2013/057710
§ 371 (c)(1),
(2) Date: Sep. 17, 2015

(87) PCT Pub. No.: WO2014/147721
PCT Pub. Date: Sep. 25, 2014

(65) Prior Publication Data
US 2016/0052481 A1    Feb. 25, 2016

(51) Int. Cl.
*B60R 21/26* (2011.01)
*F42B 3/12* (2006.01)
*B60R 21/264* (2006.01)

(52) U.S. Cl.
CPC .......... *B60R 21/26* (2013.01); *B60R 21/2644* (2013.01); *F42B 3/121* (2013.01); *B60R 2021/26029* (2013.01)

(58) Field of Classification Search
CPC ................ B60R 21/26; B60R 21/264; B60R 2021/26029; F42B 3/121; F42B 3/12
(Continued)

(56) References Cited

U.S. PATENT DOCUMENTS 3,971,320 A    7/1976   Lee
5,686,691 A    11/1997  Hamilton et al.
(Continued)

FOREIGN PATENT DOCUMENTS

JP    02-000595 A    1/1990
JP    2006-125650 A  5/2006
(Continued)

OTHER PUBLICATIONS

International Search Report of PCT/JP2013/057710.

*Primary Examiner* — Joshua Freeman
(74) *Attorney, Agent, or Firm* — Mattingly & Malur, PC

(57) ABSTRACT

This igniter has a heating element, an ignition agent positioned so as to be in contact with the heating element, and conductive pins that pass through an insulating layer, and are electrically connected to the heating element. One end of each conductive pin is exposed through the insulating layer in such a manner that a current supply component, which supplies an ignition current, is connected to the heating element. An IC tag is positioned inside the insulating layer, in the vicinity of the conductive pins.

14 Claims, 11 Drawing Sheets

(58) Field of Classification Search
USPC .............. 102/530, 200, 202, 202.5, 204
See application file for complete search history.

(56) References Cited

U.S. PATENT DOCUMENTS

| | | | | |
|---|---|---|---|---|
| 6,460,884 | B1* | 10/2002 | Nakashima | B01D 46/24 102/530 |
| 6,491,321 | B1* | 12/2002 | Nakashima | B01D 46/24 102/530 |
| 7,961,103 | B2 | 6/2011 | Andrenko et al. | |
| 2006/0087106 | A1 | 4/2006 | Young et al. | |
| 2006/0162607 | A1* | 7/2006 | Kodama | B60R 21/2644 102/530 |
| 2006/0207469 | A1* | 9/2006 | Fink | F42B 3/103 102/530 |
| 2006/0260498 | A1* | 11/2006 | Hatomoto | F42B 3/103 102/202.14 |
| 2009/0266265 | A1* | 10/2009 | Maeda | F42B 3/122 102/530 |
| 2009/0288574 | A1* | 11/2009 | Jackson | B60R 21/263 102/530 |
| 2010/0018431 | A1* | 1/2010 | Maeda | B60R 21/2644 102/530 |
| 2010/0072736 | A1* | 3/2010 | Maeda | F42B 3/18 280/741 |
| 2011/0283910 | A1 | 11/2011 | Moore | |
| 2012/0118193 | A1* | 5/2012 | Sawada | F42B 3/107 102/530 |
| 2012/0180692 | A1* | 7/2012 | Hironaka | B60R 21/264 102/530 |
| 2012/0199036 | A1* | 8/2012 | Fink | F42B 3/198 102/530 |
| 2012/0227608 | A1* | 9/2012 | Givens | F42B 3/121 102/311 |
| 2013/0276662 | A1* | 10/2013 | Ohsugi | B60R 21/2644 102/530 |
| 2013/0305952 | A1* | 11/2013 | Fukumoto | C06D 5/06 102/530 |
| 2014/0096697 | A1* | 4/2014 | Okuyama | B60R 21/2644 102/530 |
| 2016/0052486 | A1* | 2/2016 | Ohsugi | B60R 21/26 102/530 |
| 2016/0169640 | A1* | 6/2016 | Schwuchow | B23P 19/00 102/530 |

FOREIGN PATENT DOCUMENTS

| | | |
|---|---|---|
| JP | 2006-282091 A | 10/2006 |
| JP | 2007-062492 A | 3/2007 |
| JP | 2007-226574 A | 9/2007 |
| JP | 2008-013031 A | 1/2008 |
| JP | 2008-090813 A | 4/2008 |
| JP | 2009-272768 A | 11/2009 |
| WO | 03/079305 A1 | 9/2003 |

* cited by examiner

F I G. 1 A
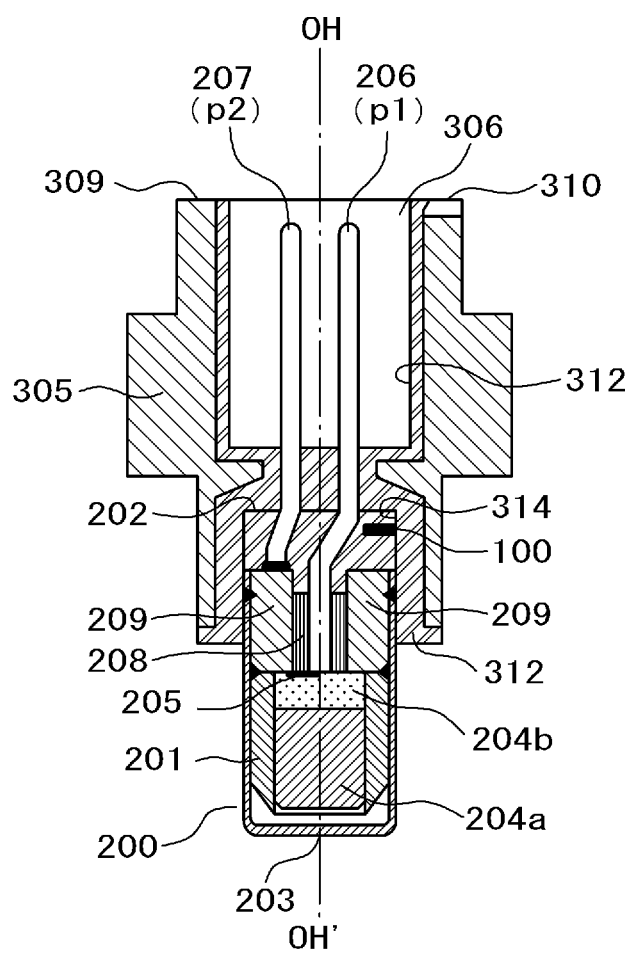

F I G. 2 A
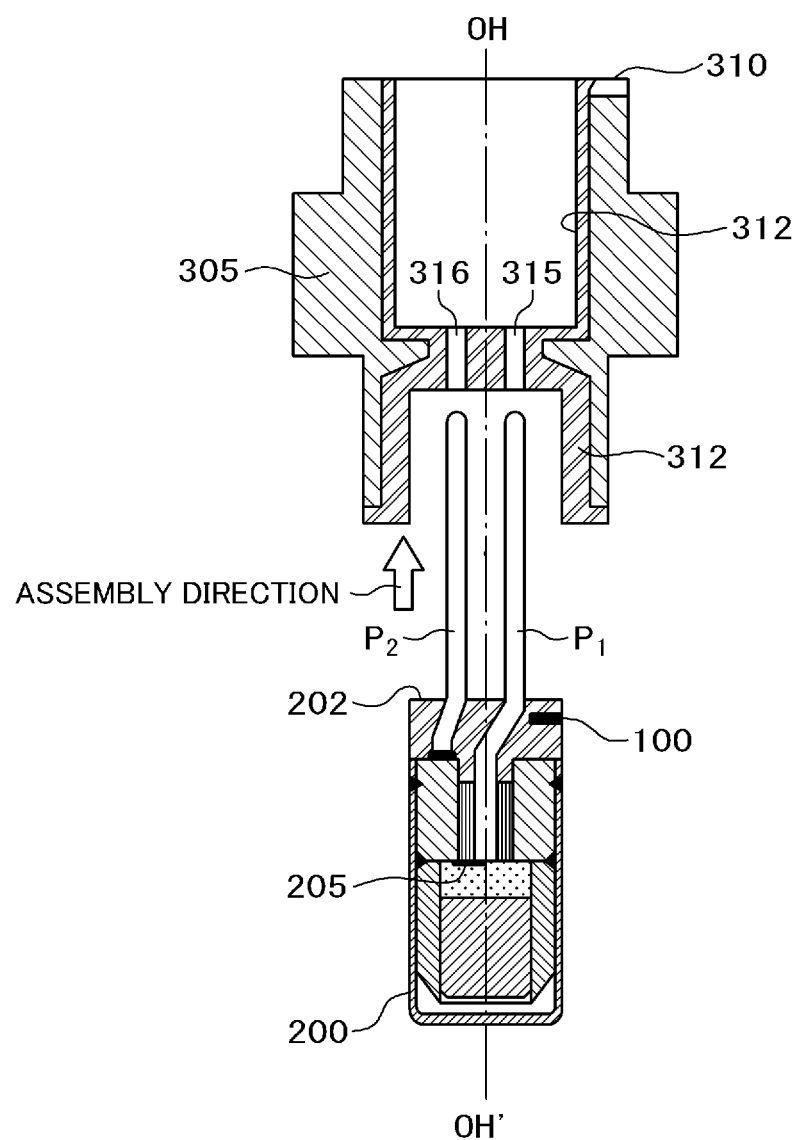

F I G. 4
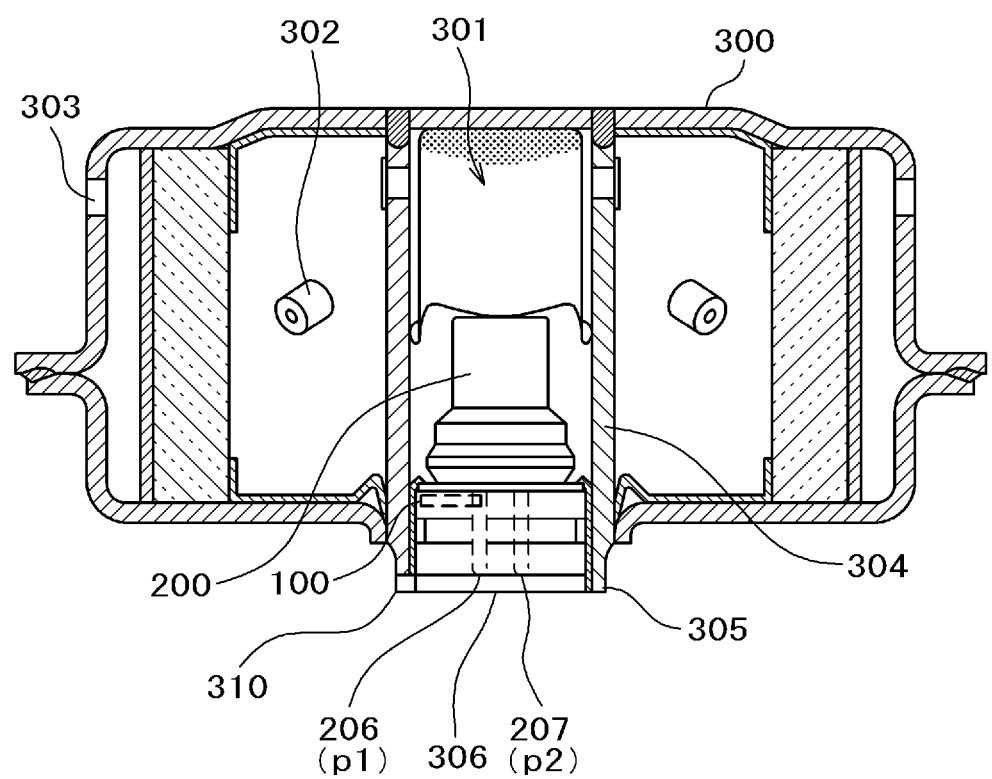

F I G. 6
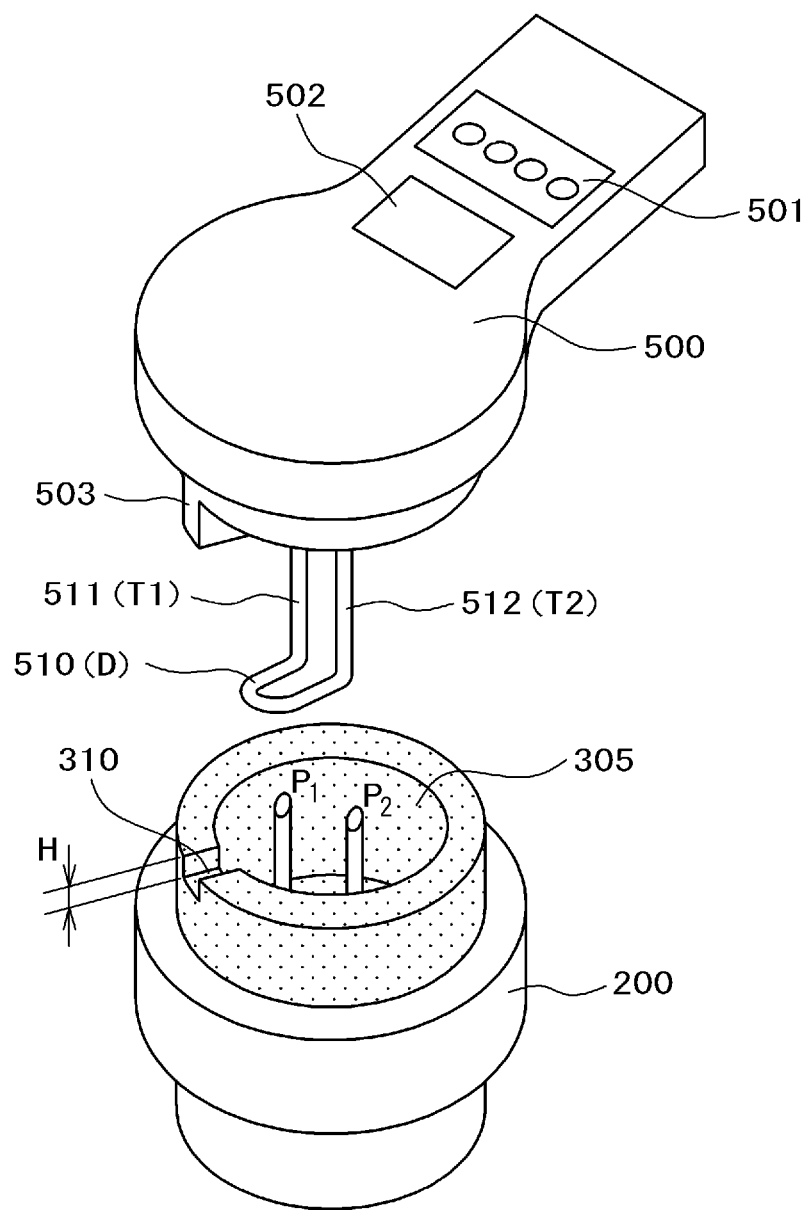

IGNITER, IGNITER ASSEMBLY, AND DETECTION SYSTEM AND DETECTION METHOD THEREFOR

TECHNICAL FIELD

The present invention relates to an igniter, an igniter assembly, and a detection system and a detection method therefor. Particularly, the present invention relates to an IC tag incorporated igniter and an igniter assembly used for equipment such as an airbag apparatus utilizing electrical ignition, and a detection method therefor.

BACKGROUND ART

An airbag system is equipped with an electric igniter or an igniter assembly (an initiator, hereinafter simply referred to as an igniter assembly unless it is necessary to make a particular distinction) as a gas generator (an inflator) for instantaneously inflating an airbag so as to protect a driver or a pilot in a vehicle collision. This igniter assembly is an apparatus which is formed by integrally molding the igniter with a resin, followed by crimping a metal collar on the resultant mold, or an apparatus which is formed by integrally resin-molding the igniter and the metal collar. Both of the igniter assemblies have a structure which contains therein a heating element for ignition and includes conductive pins extended to the outside.

Patent Literature 1 discloses an igniter assembly which includes a wireless tag (a RFID tag or simply referred to as an IC tag) juxtaposed to electronic components such as LSIs cladded with an insulating material and the whole body of which is covered with an insulating material. In spite of a packaged state, the assembly is adapted for accurate acquisition of information on the electronic components.

Further, Patent Literature 2 discloses an airbag apparatus capable of contactless transmission of electric power for airbag deployment and an airbag deploying signal from a vehicle side to an airbag side. The apparatus includes, on the airbag side, the RFID tag (a RFID tag or simply referred to as an IC tag) retaining airbag specific information of the airbag along with an ignition circuit or a squib for firing or igniting explosive charge. Thus, the apparatus permits the vehicle to identify the air bag to be connected when the vehicle side and a steering side are coupled together in a contactless manner.

Further, Patent Literature 3 discloses an RFID tag reader/writer device which includes a minute loop so as to communicate with a small metal RFID tag.

Patent Literature 4 discloses an initiator in which an end of a center pin, a cylindrical sleeve and a bridge wire are interconnected and are covered in a non-conductive cup-shaped case in a state where an ignition agent is charged in space formed in an inner cup.

Patent Literature 5 discloses an initiator in which a header with one conductive pin fixed thereto is disposed in a metallic cup and the conductive pin and the header are interconnected with a bridge wire.

CITATION LIST

Patent Literature

Patent Literature 1: Japanese Unexamined Patent Application Publication No. 2007-226574
Patent Literature 2: Japanese Unexamined Patent Application Publication No. 2007-62492
Patent Literature 3: Japanese Unexamined Patent Application Publication No. 2008-90813
Patent Literature 4: U.S. Pat. No. 3,971,320
Patent Literature 5: U.S. Pat. No. 5,686,691

SUMMARY OF THE INVENTION

Technical Problem to be Solved by the Invention

A correct assembly and fabrication of an ignition apparatus is required for reliable protection of the driver or the pilot by the airbag in time of emergency.

Further, it is desirable to protect the electronic components including the ignition apparatus with metallic shield in terms of safety.

In the management of products or parts, it has been a conventional practice to affix barcodes to the products or parts, or to directly imprint numbers on the products or parts. In this case, the products or parts need to have a sufficient space to affix the barcode or need to be large enough to allow visually recognizable imprints. However, the igniter assembly is too small in size to allow for the affixture of the conventional barcode. If manufacturing information is directly imprinted on the igniter assembly, the imprints are too small to be visually recognized. Further, the igniter assembly is resin-molded in the final stage so that the imprints cannot be visually read or mechanically read from outside. Therefore, discrete management of the igniter by directly recording the manufacturing information thereon has not been provided. If a critical safety part such as an airbag fails, the serial number and the manufacturing record are tracked to analyze the cause of failure and to determine the range of failure. The igniters are not under the discrete management as described above and thence, involve a problem that the range of failure is defined unduly wide or that it is difficult to implement measures to prevent recurrence of failure of the igniter.

The electronic component of Patent Literature 1 is not assumed to be applied to the airbag. The RFID tag (the IC tag) of Patent Literature 2 is disposed directly above a power storage capacitor arranged on an airbag housing body. That is, the RFID tag is disposed outside the airbag housing body and hence, is not protected by the metallic shield.

If the structure of Patent Literature 1 where the IC tag is not protected by the metallic shield is applied to the initiator, the interior of the electronic components cannot be protected from impact at the airbag deployment because the electric components are merely covered with the insulating material.

The patent literatures 2 to 5 do not teach to incorporate the IC tag into the igniter assembly in the airbag housing body.

An object of the present invention is to provide an igniter or an igniter assembly which enhances reliability by incorporating the IC tag into the igniter or the igniter assembly and which is not increased in external dimensions after incorporation of the IC tag, as well as to provide a detection method therefor.

Means of Solving the Problems

A typical aspect of the present invention is as follows. The igniter includes: a heating element; an ignition agent (hereinafter, also referred to as ignition charge) disposed in contact with the heating element; and a conductive pin penetrating an insulating layer and electrically connected to the heating element. The other end of the conductive pin is exposed from the insulating layer in order to be connected with a component for supplying an ignition current to the heating element (also referred to as current supply component or current supply member). An IC tag is disposed in the insulating layer and in the vicinity of the conductive pin.

It is noted that the component for supplying the ignition current (current supply component) refers to a connector directly connected to the pin or a lead wire connected to the pin by welding or brazing.

Advantageous Effect of Invention

Heretofore, the igniter and igniter assembly per se are so small in size that the labeling or identification from the imprint is quite difficult. According to the present invention, by incorporating the IC tag, it facilitates not only the quality control of the igniter or the igniter assembly heretofore difficult but also the cause analysis of a failure and specification of the range of the failure and specification of the range of the fault detected from the igniter assembly during the operation thereof. In this respect, the present invention is meaningful in that the object in which the IC tag is incorporated is the igniter or the igniter assembly which is small in size and subjected to heat or impact upon actuation.

BRIEF DESCRIPTION OF DRAWINGS

FIG. 1A is a vertical sectional view showing an IC tag incorporated igniter assembly according to a first embodiment of the present invention.

FIG. 2A is a vertical sectional view for illustrating an assembly method for the igniter assembly according to the embodiment, showing a state thereof before assembly.

FIG. 4 is a sectional view of a gas generator employing the igniter assembly according to the first embodiment of the present invention.

FIG. 6 is a perspective view showing an IC tag communication reader/writer and an igniter according to a second embodiment of the present invention.

MODE FOR CARRYING OUT THE INVENTION

Figure 1B:
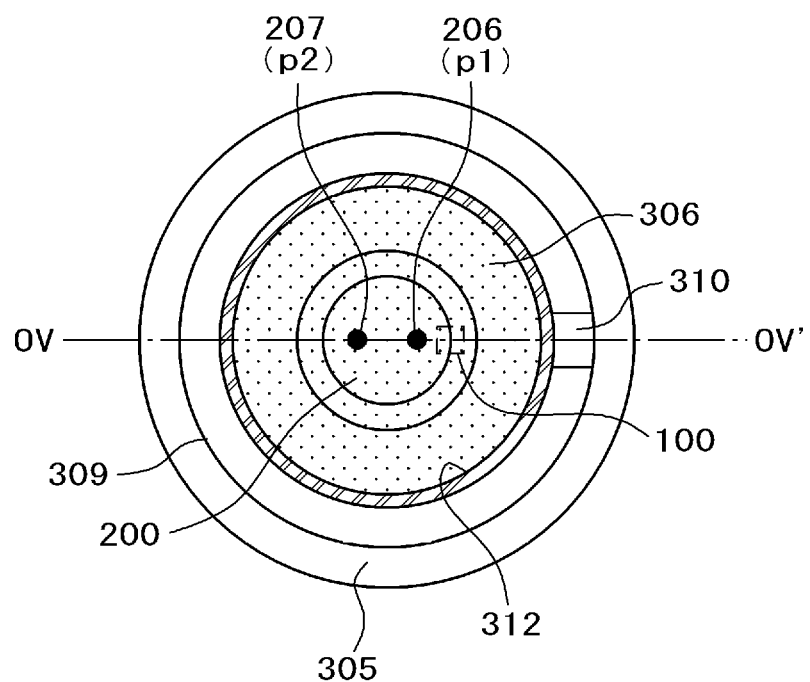
FIG. 1B is a plan view corresponding to FIG. 1A.

In an igniter assembly according to one embodiment of the present invention where an electric signal line (a conductive pin) is led out from an internal circuit of a shield vessel thereof via an insulating layer, an IC tag is disposed in the insulating layer in the vicinity of the conductive pin of the igniter. This allows the acquisition of production lot information and shipping information based on the ID number so that not only the quality control of the igniter or igniter assembly but also the cause analysis of a failure detected from the igniter assembly in the operation thereof can be carried out.

In an igniter assembly according to another embodiment of the present invention where a plurality of electric signal lines (a plurality of conductive pins) are led out from the internal circuit of the shield vessel thereof via the insulating layer, the IC tag is disposed in the insulating layer and in the vicinity of the conductive pin while a space in the shield vessel for connection of a current supply component for supplying an ignition current is utilized as a window for detection of this IC tag. In this case, the IC tag is assembled in the shield vessel in the immediate vicinity of the conductive pin to be detected, and IC tag communication is performed by the reader/writer which invokes the IC tag disposed on the opposite side therefrom across the insulating layer by pinpoint transmission of electromagnetic waves from the outside of the insulating layer to the immediate vicinity of the conductive pin to be detected. It is noted that a primary current flows through a coil antenna at a distal end of a detection portion of the IC tag reader/writer while a coil antenna of the IC tag on the opposite side via the insulating layer is opposed to the coil antenna of the IC tag reader/writer. This arrangement electromagnetically couples the coils of the two antennas so that a secondary current is induced in the coil antenna of the IC tag by mutual induction. Namely, the IC tag is operated by inducing the secondary current from the primary current of high frequencies while the IC tag information is induced inversely from the secondary current to the primary current.

Since the shield vessel and the insulating layer for the signal lines are used as an area of inductive coupling by mutual induction between the primary current and the secondary current, the shorter the distance between the coil antenna at the distal end of the detection portion and the coil antenna of the IC tag or the thinner the thickness of the insulating layer covering the IC tag, the higher the coupling efficiency.

Thus, the IC tag communication can be performed even in the shield vessel made of metal so that the IC tag reader/writer can acquire identification information such as ID number specific to the igniter assembly. Thus the reliability of each apparatus assembled as a final product is enhanced. In the event of an unexpected voluntary recall of the product, the narrowing of the production lot information and shipping information based on the ID number can be facilitated.

The embodiments of the present invention will be described in detail with reference to the accompanying drawings.

First Embodiment

Now referring to FIG. 1A to FIG. 5, description is made on an igniter, an igniter assembly, and an airbag system employing the same according to a first embodiment of the present invention.

FIG. 1A is a vertical sectional view showing an igniter 200 according to one embodiment of the present invention. FIG. 1B is a plan view corresponding to FIG. 1A.

The igniter 200 includes a charge holder 201, a header 202, an eyelet 209 fixed to this header 202, and a cover 203, and also an ignition charge 204 (ignition charges 204a, 204b) sealed in space enclosed by these components. A first electrode (one end of a first conductive pin 206 (P1)) and a second electrode (one end of the eyelet 209 connected to a proximal end of a second conductive pin 207 (P2)) are electrically interconnected by a bridge wire 205. First-electrode side and second-electrode portions (base portions) of the conductive pins (P1, P2) are sealed with an insulating layer made of resin. Numeral 208 denotes a robust insulating material such as glass. The charge holder, eyelet and cover are formed of metal. The tabular IC tag 100 is embedded in the header 202 made of resin and in the vicinity of the first conductive pin 206 (P1) in a manner to direct a coil surface thereof in a direction perpendicular to an axis OH-OH' passing through the center between the first conductive pin (a center pin, P1) and the second conductive pin (an eyelet pin, P2). A metallic shield vessel (an igniter collar) 305 is fixed to an outer periphery of the header 202. The inside of this igniter collar defines a cylindrical connector insertion space (a connection space for current supply component) 306 which is covered with a resin mass 312. The first conductive pin 206 and the second conductive pin 207 project into this connection space 306 for current supply component. A space 314 for inserting the igniter is also formed inside the igniter collar. Further, a positioning groove 310 is formed in a part of an upper end surface 309 of the igniter collar 305.

According to the present invention, it is defined an integrated unit of the metallic shield vessel (the igniter collar) and the igniter as the igniter assembly.

The IC tag 100 may be associated with either one of the first conductive pin 206 and the second conductive pin 207 or otherwise, may be embedded in the header 202 at place spaced from the axis OH-OH'.

The portion 309 also defines an annular flange disposed at an end of the connector insertion space 306. The positioning portion 310 (a concavo-convex structure) extended in a direction perpendicular to the axis OH-OH' (radial direction) is disposed at the annular flange at place corresponding to the IC tag 100. This positioning portion 310 serves as a positioning portion for an IC tag communication reader/writer to be described hereinafter. The positioning portion 310 is not limited to the concavo-convex structure but may have any structure, such as a combination of a positioning pin and a hole, which can fix a relative positional relation between the conductive pins (P1, P2) of the igniter 200 and the IC tag communication reader/writer.

The IC tag 100 has a tabular shape and is mounted perpendicularly to the axial direction of the conductive pin. Specifically, the IC tag 100 is mounted flat at the base of the conductive pin (P1, P2) extending outward from a heating element within the igniter 200. In this manner, the IC tag 100 is horizontally arranged in parallel to a surface of the insulating layer (or the bridge wire) of the igniter 200 (parallel arrangement). It is noted that the IC tag 100 does not necessarily have to be horizontally arranged but may be arranged aslant in the header 202 as needed in a relation with another component. In such a case, however, a configuration may be made such that a detection portion of the IC tag communication reader/writer can be arranged in parallel to a surface of the IC tag 100. In a case where the igniter 200 also incorporates therein an additional electronic circuit, the number of the conductive pins is three or more.

As described above, the IC tag 100 is placed in the vicinity of the conductive pin (P1, P2) and sealed in the plastic insulating layer (the header 202) forming the header 202. Specifically, the igniter 200 along with the heating element and the base of the conductive pins (P1, P2) contained therein is inserted in the metallic shield vessel (the igniter collar) 305 and sealed with the plastic insulating layer. After sealed, therefore, only the conductive pins (P1, P2) extend outside while the IC tag 100 is normally out of sight. If the igniter 200 with the conductive pins (P1, P2), as turned 180° and positioned right side left, is inserted (reversed insertion) in the metallic shield vessel (igniter collar) and sealed with the resin, the polarities of the conductive pins (P1, P2) cannot be visually recognized. FIG. 1B depicts the IC tag 100 with a dotted line so as to purposely visualize the tag for convenience.

Figure 2B:
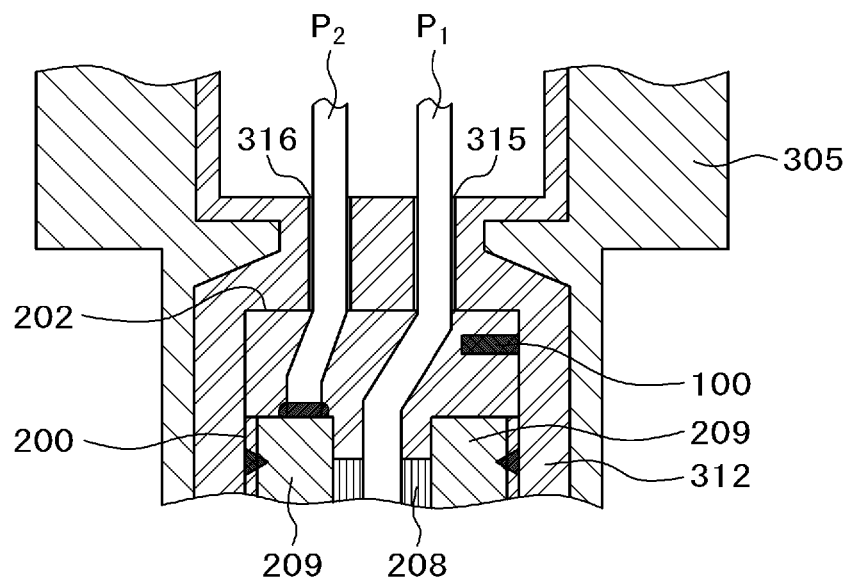
FIG. 2B is an enlarged sectional view showing a positional relation of an IC tag in the assembled igniter assembly.

An example of an assembling method for the igniter assembly according to the embodiment is described with reference to FIG. 2A and FIG. 2B. FIG. 2A is a vertical sectional view showing a state before the igniter 200 and the igniter collar 305 are assembled together. FIG. 2B shows a positional relation of the IC tag in the assembled unit.

The connector insertion space 306 and the space 314 for receiving the igniter 200 are formed inside the metallic shield vessel (igniter collar) 305. The igniter assembly shown in FIG. 1A is assembled by inserting the igniter 200 in the space 314 for receiving the igniter 200, followed by filling the resin 312 in the space for unifying the igniter with the shield vessel. The IC tag 100 is embedded in the immediate vicinity of the conductive pin P1. For illustrative purposes, FIG. 2A shows the state where the resin 312 is applied in the metallic shield vessel (igniter collar) 305 and is formed with holes 315, 316 penetrated by the conductive pins (P1, P2). However, the holes are formed by the conductive pins (P1, P2) when the resin 312 is injected in the space. The holes in the resin mass 312 are not previously formed in the embodiment.

It does not matter if another method is taken where the resin mass 312 and the header 202 of the igniter 200 are assembled together by simultaneously resin-molding the resin mass 312 and the header 202. Any method is usable so long as the configuration of FIG. 1A is eventually obtained.

Figure 3:
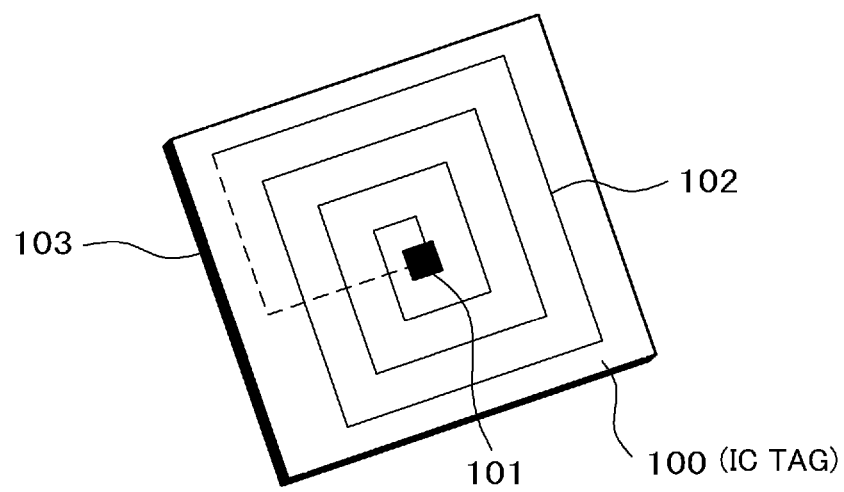
FIG. 3 is an enlarged perspective view showing the IC tag of FIG. 1A.

FIG. 3 is an enlarged perspective view of the IC tag 100. The IC tag 100 includes an IC tag main body disposed on a surface of a tabular substrate, and an IC-tag insulating substrate 103 formed on a back side of the substrate. The IC tag main body includes: an IC chip 101, a planar coil antenna 102 formed by spirally winding plural turns of coil around this IC chip 101, and a protective material, etc. The coil antenna has its inner end connected to the IC chip 101, and its outer end connected the IC chip 101 via the insulating layer on the back side of the main body.

The UHF band and microwave band IC tags are roughly divided into: (1) an IC tag which is 10 cm long on a side and incorporates therein a half-wavelength resonant dipole antenna with notable wavelength dependency; and (2) an ultra-small IC tag which is 10 mm or less long on a side and incorporates therein a resonant circuit employing a coil or capacitor free from wavelength dependency. The coil constituting the resonant circuit includes, for example, the planar coil formed on the tabular substrate as shown in FIG. 3, an unillustrated cylindrical coil and the like. The coil has an invisible stray capacity and may sometimes permits omission of a capacitor as a part element. FIG. 3 shows this connection omitting the capacitor.

The type of the IC tag 100 for use in the igniter or the igniter assembly of the embodiment may be decided according to the structure or the like of the igniter or the igniter assembly. If priority is given to microminiaturization, the above-described ultra-small tabular IC tag is suitable.

FIG. 4 is a sectional view showing a gas generator 300 employing the igniter assembly. The gas generator 300 includes a metallic shell vessel having pressure resistance and is centrally formed with a cylindrical opening in which a metallic cylinder vessel 304 having pressure resistance is fixed. The igniter 200 is fixed in space on a bottom side of the cylinder vessel. The igniter assembly including the igniter 200, as shown in FIG. 4, has a minor difference in structure from that of the igniter assembly shown in FIG. 1, but has the same basic structure where the IC tag 100 is embedded in the resin and in the vicinity of the conductive pin (P1, P2).

In the gas generator 300, a gas generating agent mold 302 is filled in space outside the metallic inner cylinder vessel 304. 303 denotes a gas discharge port.

According to the present invention, the ultra-small IC tag is employed so as to incorporate/attach the IC tag in/to the igniter 200. The IC tag suited to such a downsizing application is exemplified by an ultra-small UHF band tag having external dimensions of 2.5 mm×2.5 mm and a thickness of 0.4 mm (IM5-PK2525 tag (registered trademark) commercially available from Hitachi Chemical Co., Ltd.). For example, this tag can achieve carry on the order of several millimeters in response to a predetermined detective radio wave output from the IC tag communication reader/writer.

Next, an example of a current supply circuit 400 connected to the igniter 200 of the embodiment is described with reference to FIG. 5. This current supply circuit 400 is installed in an ECU of an automobile, for example. The air bag system carried by a vehicle includes an ECU including the current supply circuit 400, and a plurality of airbag modules connected to this ECU and each containing the gas generator 300 and an airbag in a case. The ECU including the current supply circuit 400 and the respective gas generators 300 are connected to the respective airbag modules via conductors.

The current supply circuit 400 is formed on a single substrate, for example. This substrate is provided with connection portions (connection terminals) 401, 402 at one end thereof for electrically connecting the current supply circuit 400 to the first conductive pins 206 (P1) and the second conductive pins 207 (P2) of the igniters 200. For convenience of explanation, it is assumed that the first conductive pin 206 is connected to a positive electrode and the second conductive pin 207 is connected to a negative electrode (ground). The current supply circuit 400 has various elements arranged on the substrate, the elements at least including: switching circuits 410, 411; pulse generators 412, 413; a disconnection detection circuit 414; a voltage converter 421; a capacitor 420 and the like. The current supply circuit is interposed in a current path interconnecting a battery 430 as an external DC power source and the igniters 200 incorporated in the gas generators 300 via an ignition key 431. One igniter 200 is provided with two current paths, each of which is formed of two conductors (lead wires). The switching circuits 410, 411, the pulse generators 412, 413, and the disconnection detection circuit 414 are further connected to a micro-computer unit (MCU) 422 via an interface 415. The MCU 422 is connected with a ROM 423 and is further connected, via an interface 424, to an impact sensor 440 and other components 450 such as an engine controller and brake sensor, which are disposed outside the substrate.

Not only the single-type gas generator shown in FIG. 4 but also a dual-type gas generator can be used as the gas generator accommodated in the case of the air bag module.

Figure 5:
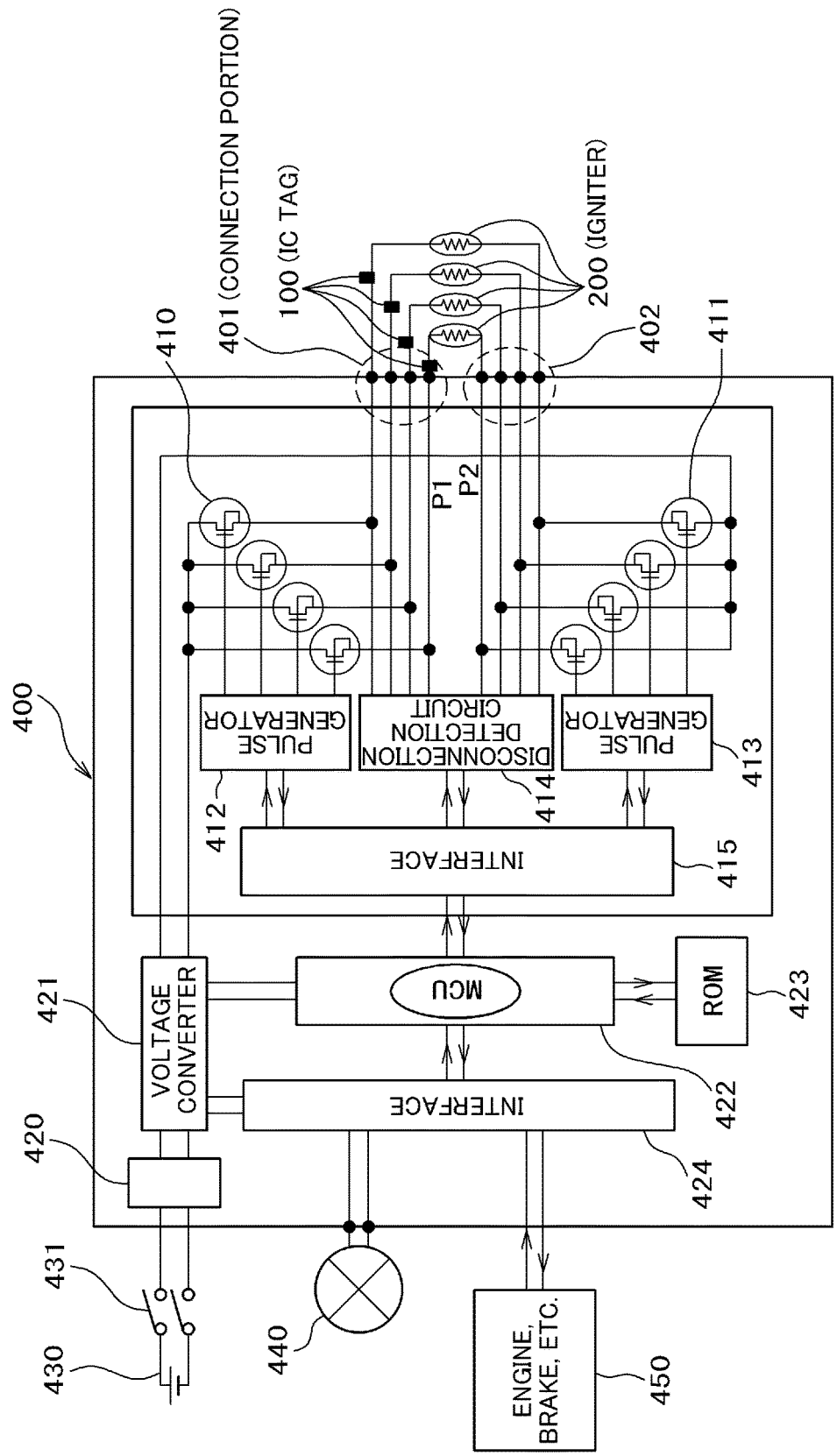
FIG. 5 is a conceptual diagram of a current supply circuit connected to the igniter according to the embodiment of the present invention.

While FIG. 5 shows four igniters 200 connected to the current supply circuit 400, these igniters are assembled with, for example, an airbag inflator for driver seat, an airbag inflator for passenger seat and the like, respectively. The IC tag 100 is embedded in each of the igniters. In the example of FIG. 5, the IC tag 100 is disposed in each igniter in the vicinity of the first conductive pin (P1). This IC tag 100 is disposed for externally acquiring specific identification information such as ID number, and manufacturing information or for detecting whether the igniter and the connection portion 401, 402 of the current supply circuit are properly connected or not (reversed insertion).

The switching circuits 410, 411 of the current supply circuit 400 are operative to open and close the current path. The switching circuit cuts off the direct current when the igniter 200 need not operate and starts to supply the current when the igniter 200 is operated. The switching circuit 410, 411 is provided for each current path (on a one-on-one basis). The disconnection detection circuit is responsible for detecting a failure of the igniter (contact failure between a heating portion of the igniter and the ignition charge, or the disconnection of the heating portion).

The switching circuit 410, 411 and the pulse generator 412, 413 are interconnected by a conductor. The switching circuit is opened or closed by means of the pulse generator transmitting a control pulse to open or close the switching circuit. A command directing this pulse generator to transmit the control pulse is transmitted from the MCU 422 responding to a command from the impact sensor 440. The switching circuit 410, 411 is composed of a thyristor, a MOS-FET, a bipolar transistor or the like. The switching circuit may be disposed only on the positive electrode side.

The current supply circuit is energized only by the battery. The capacitor 420 stores a required current as a backup power source so as to supply a current in place of the battery when the current from the battery is cut off.

In vehicle collision, a command from the impact sensor is transmitted to the ECU, which transmits to the pulse generator a command to close the switching circuit. In response to this command, the current from the battery, as an ignition pulse for triggering the igniter, is transmitted to the igniter 200 via the current path. In response to this ignition pulse, the gunpowder in the igniter 200 is ignited to deploy the airbag.

In the prior art, the igniter or the igniter assembly per se is so small in size that the labeling or identification from the imprint is quite difficult. According to the embodiment, mere incorporation of the IC tag allows for not only the quality control of the igniter or the igniter assembly but also the cause analysis of a failure detected from the igniter assembly during the operation thereof. In this respect, this embodiment means much in that the object to incorporate the IC tag is the igniter or the igniter assembly which is small in size and subjected to heat or impact upon actuation.

The igniter and igniter assembly according to the embodiment are applicable to a variety of inflators (gas generators) such as an air bag inflator for driver seat, an air bag inflator for passenger seat, an inflator for side airbag, an inflator for curtain airbag, an inflator for knee bolster, an inflator for inflatable seat belt, an inflator for tubular system, and an inflator for pretensioner.

Second Embodiment

In the igniter assembly where the IC tag is incorporated in the vicinity of the conductive pin and these components are integrally resin-molded as taught by the present invention, the current supply component connected to the conductive pin is not limited to the connector of the first embodiment and may also be a lead wire connected to the conductive pin by welding or brazing as suggested by Patent Literature 4.

If the igniter assembly has a structure negating the need for detection of the reversed insertion of the conductive pins, it is important to adopt the igniter assembly incorporating the IC tag therein in order to analyze the cause of failure or determine the range of failure on occurrence of failure. The igniter for use in the igniter assembly may have a structure where one conductive pin is provided, as disclosed in Patent Literature 5, for example.

According to the embodiment, if the object to incorporate the IC tag is the igniter assembly which is small in size and subjected to heat or impact upon actuation, the IC tag embedded in the resin and dully incorporated can be easily detected from outside.

Third Embodiment

Next, description is made on a third embodiment of the present invention which pertains to means for detecting whether or not the igniter 200 and the connection portions 401, 402 of the current supply circuit 400 as described in the first embodiment are properly connected.

FIG. 6 is a perspective view showing an IC tag communication reader/writer 500 and the igniter 200. The IC tag communication reader/writer 500 includes: an operation portion 501 and a display portion 502 which are disposed on the surface of a main body thereof; a high-frequency antenna circuit (not shown), a power source and a control circuit (not shown) which are disposed in the main body; and a detection portion 510 integrally disposed at a distal end of the main body. The antenna in the main body and the detection portion 510 are interconnected by a pair of signal transmission portions T (cable) 511, 512 extended downward from the distal end of the main body. The antenna circuit in the main body and the detection portion 510 exposed to the outside defines a minute-loop detecting coil having a coil surface perpendicular to an axis of the pair of cables 511, 512. While the figure shows the minute-loop detecting coil 510 (D) having a single coil turn, the number of coil turns may be two or more in the interest of circuit efficiency such as high-frequency matching. The IC tag communication reader/writer 500 further includes an engagement portion (concave portion or convex portion) 503, which is mechanically fitted in a depth H of the positioning portion 310 (concavo-convex structure) of the gas generator 300 (or the igniter assembly) whereby the detecting coil of the detection portion 510 is fixed at a predetermined position in the cylindrical connecter insertion space 306 in the igniter collar 305 of the igniter 200. The connector insertion space is formed of an insulating resin. Specifically, the detection portion 510 is fixed in the igniter 200 at a position to detect the IC tag 100 and in the predetermined depth H.

The engagement portion 503 positions the IC tag communication reader/writer 500 at the predetermined position relative to the igniter assembly and serves as a mark for distinction between a "normal position" where the first conductive pin P1 is located in the immediate vicinity of this engagement portion 503 and the second conductive pin P2 is located on a far side therefrom and a "erroneous position" where the conductive pins are reversely inserted. The electromagnetic wave output is adjusted such that the IC tag 100 is detected when the detection portion 510 is fitted in the predetermined depth H of the engagement portion 503.

Figure 7:
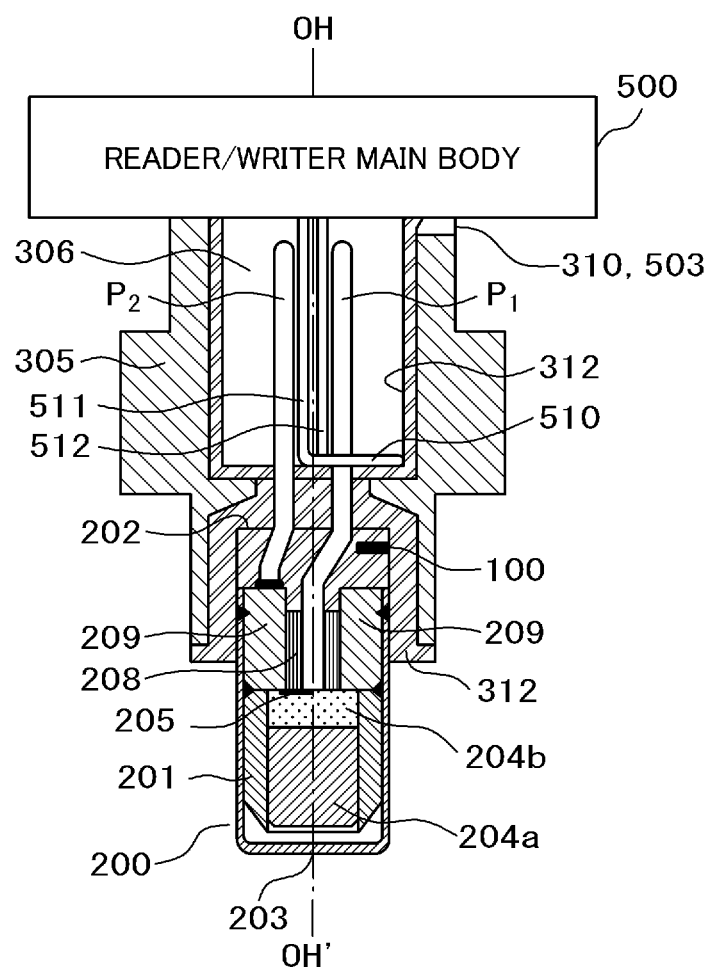
FIG. 7 is a diagram for illustrating a structure where inserted positions of a first conductive pin P1 and a second conductive pin P2 of the igniter with the embedded IC tag are detected by the IC tag communication reader/writer set at a predetermined position.

FIG. 7 is a vertical sectional view showing a state where the engagement portion 503 of the IC tag communication reader/writer 500 is matched with the concavo-convex structure 310 of the igniter assembly so as to mechanically set the detection portion 510 at a predetermined rotational position and the predetermined depth in the connector insertion space 306. Namely, the figure shows the state where the detection portion 510 is inserted in the connecter insertion space 306 so as to be located in the immediate vicinity of the IC tag 100. In this state, the detecting coil 510 of the detection portion of the IC tag communication reader/writer 500 and the coil of the IC tag are electromagnetically coupled to each other so that the secondary current corresponding to the primary current in the detecting coil is induced in the coil antenna of the IC tag by the mutual induction. Therefore, the presence of the ultra-small IC tag 100 having a short carry on the order of several millimeters and embedded in the base of the first conductive pin P1 can be detected in a contactless manner.

Figure 8A:
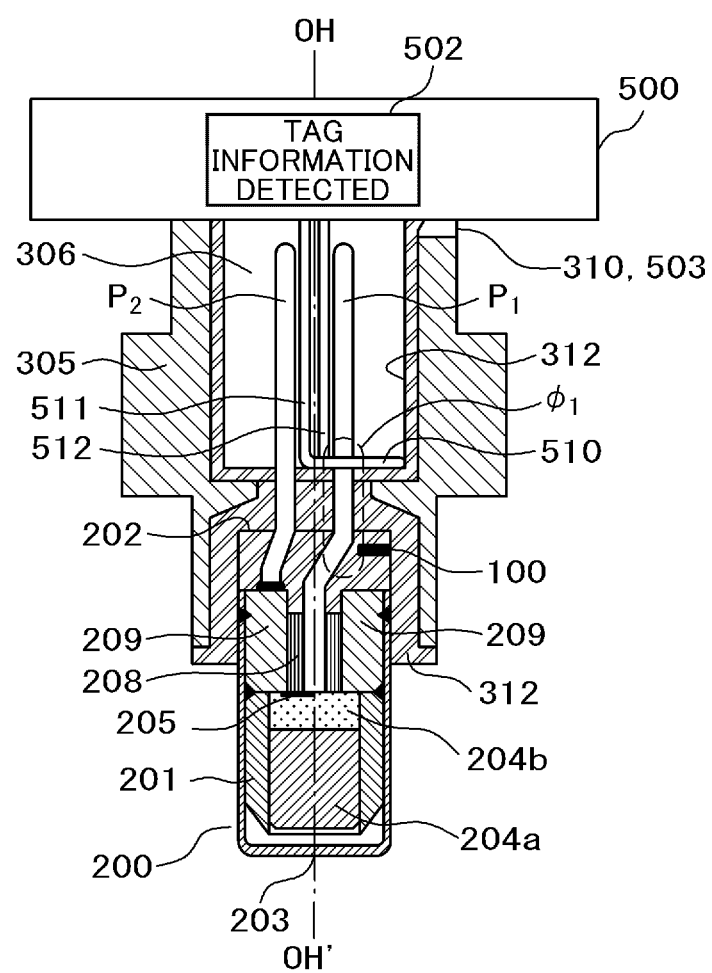
FIG. 8A is a diagram showing a state where the first conductive pin P1 and the second conductive pin P2 of the igniter are inserted at normal positions.
Figure 8B:
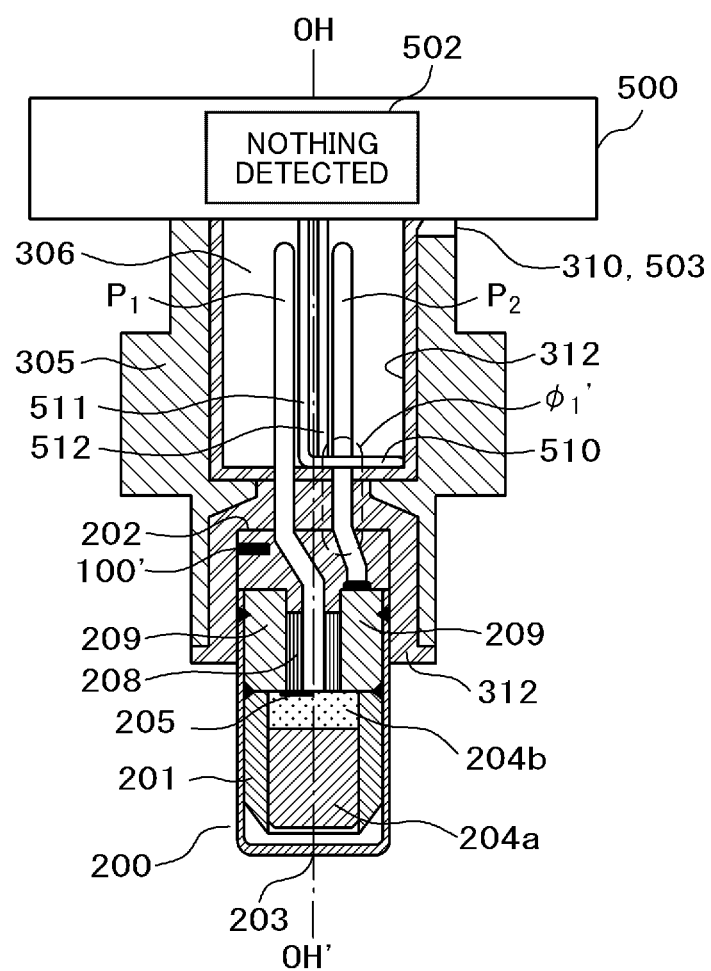
FIG. 8B is a diagram showing a state where the first conductive pin P1 and the second conductive pin P2 of the igniter are inserted at reversed positions.

FIG. 8A and FIG. 8B illustrate a structure for contactless detection of a state of the first conductive pin P1 and the second conductive pin P2 of the igniter 200 with the embedded IC tag.

FIG. 8A shows a state where the IC tag 100 is embedded in the vicinity of the first conductive pin P1 so that the first conductive pin P1 and the second conductive pin P2 of the igniter 200 are normally inserted. Φ1 represents magnetic flux lines of magnetic induction. The engagement portion 503 of the IC tag communication reader/writer 500 is in one-on-one correspondence to the positioning portion (concavo-convex structure) 310 of the gas generator 300. A region from the internal high-frequency antenna circuit of the IC tag communication reader/writer 500 to the signal transmission portions 511, 512 is defined to be a series of detection devices. When the engagement portion has the predetermined depth H and the IC tag communication reader/writer 500 is matched with this depth, the loop antenna of the detection portion 510 thereof is in parallel to the coil surface of the IC tag 100 just below and the detection portion 510 and the IC tag are fixed at positions within a predetermined distance. In this state, the detection portion 510 and the IC tag are electromagnetically coupled via the magnetic flux Φ1. Namely, a detectable condition is established.

In a case where the conductive pins are normally inserted, the detection portion 510 is electromagnetically coupled to the loop surface of the IC tag 100 so that external communication is enabled via the signal transmission portions 511, 512, the internal high-frequency antenna circuit of the IC tag communication reader/writer 500 and the like. A mutual inductive relation equivalent to the relation between a primary coil and a secondary coil of a transformer is established between the coil of the IC tag and the minute loop of the detection portion 510. Assuming that a high-frequency current of the signal transmission portion is the primary current, the magnetic flux lines induced by this primary current induces the secondary current in the coil antenna of the IC tag. The IC tag 100 energized by this secondary current returns signals indicative of the identification information such as an ID number thereof and other specific information to the internal high-frequency antenna circuit by inversely following the signal transmission portions. The sensitivity to the signal received by the IC tag communication reader/writer 500 is increased more with the decrease in the distance between the signal transmission portion and the tag 100. When the engagement portion 503 is matched with the concave-convex structure 310 of the igniter 200, the detection portion 510 detects the IC tag 100 directly thereunder and in the immediate vicinity thereof. The detection result is displayed on the display portion 502 of the IC tag communication reader/writer 500.

If the first conductive pin P1 and the second conductive pin P2 are erroneously inserted in the igniter assembly, the IC tag is deviated from the predetermined position. FIG. 8B illustrates a case where the IC tag 100' is embedded in the vicinity of the first conductive pin P1 and the first conductive pin P1 and the second conductive pin P2 of the igniter 200 are reversely inserted. In this case, the IC tag 100' is outside a range to be detected via the magnetic flux $\Phi 1'$ of the detection portion 510 so that the IC tag communication reader/writer 500 cannot detect the IC tag 100'. Since nothing is displayed on the display portion 502 of the IC tag communication reader/writer 500, the state shown in FIG. 8B is determined that the conductive pins are erroneously inserted or that the IC tag is absent.

If the igniter 200 with the embedded IC tag is mistakenly rotated through 180° and in consequence, the first conductive pin P1 and the second conductive pin P2 are reversely inserted in the igniter assembly and unified therewith, the position of the IC tag is deviated to the opposite side with respect to the engagement portion 503. In the state shown in FIG. 8B, the detective electromagnetic wave output and the like are previously adjusted such that the deviation width corresponds to an electromagnetic distance that disables the detection by the detection portion D.

Figure 9A:
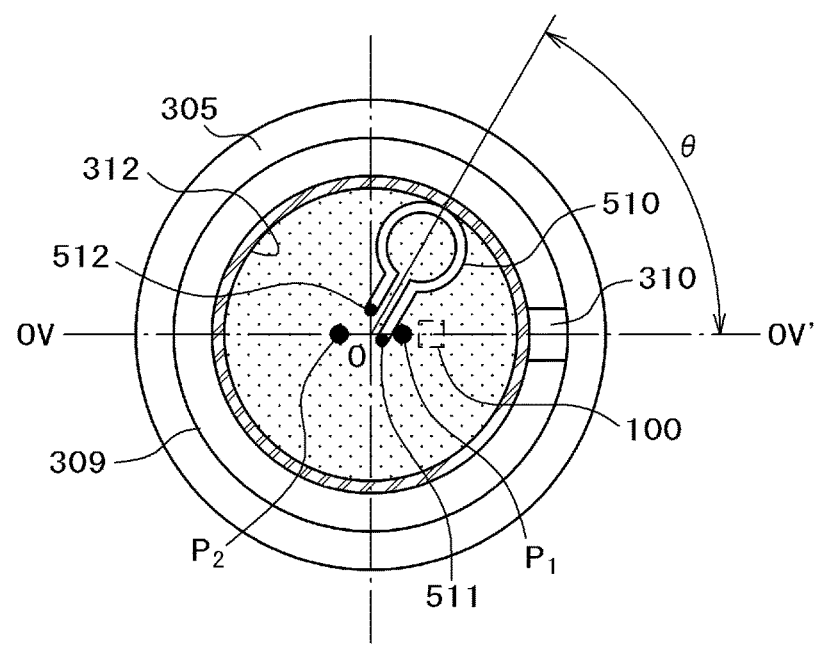
FIG. 9A is a plan view showing a positional relation of a detection portion of the IC tag communication reader/writer in a connector insertion space in the igniter.
Figure 9B:
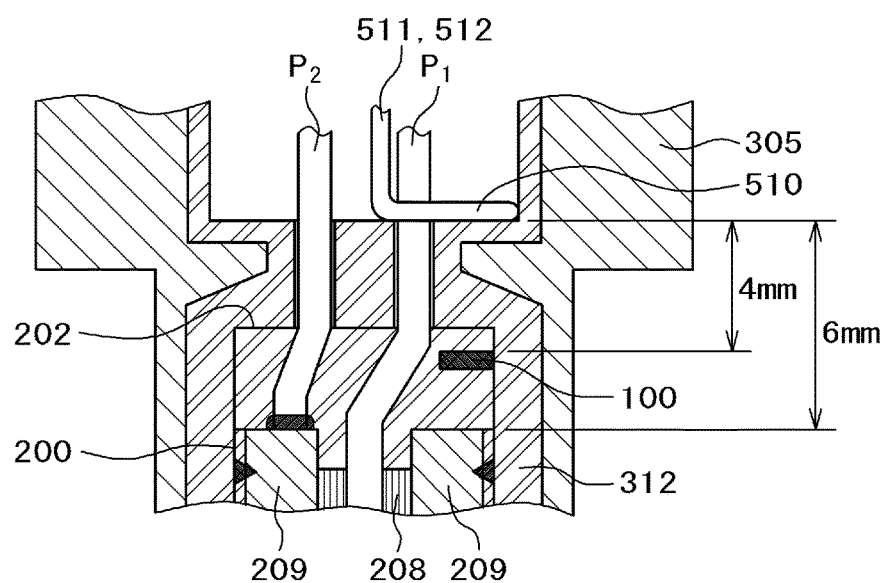
FIG. 9B is a vertical sectional view showing an example of the positional relation between the detection portion and the IC tag in the igniter.

The inventors experimented to determine whether or not the IC tag communication reader/writer 500 could detect the IC tag of the igniter assembly according to the embodiment. The results are described with reference to FIG. 9A and FIG. 9B. FIG. 9A is a plan view showing a positional relation of the detection portion 510 of the IC tag communication reader/writer 500 in the connector insertion space 306 of the igniter collar 305. FIG. 9B is a vertical sectional view showing an example of the positional relation between the detection portion 510 and the IC tag in the igniter 200.

The experiment was performed as follows. In the connector insertion space 306, the detective electromagnetic wave output of the IC tag communication reader/writer 500 was set to 27 dBm (920 MHz) and the position (rotational angle $\theta$) of the detection portion 510 was moved shifting 90° at a time. When the detection portion is positioned directly above the IC tag ($\theta=0$), a distance between the detection portion and the metallic eyelet 209 is set to 6 mm, and a distance between the detection portion and the IC tag 100 interposed therebetween is set to 4 mm. The detection portion 510 has a coil diameter of 5 mm while the IC tag is IM5-PK2525 tag (commercially available from Hitachi Chemical Co., Ltd.) having a 2.5 mm square coil. With a rotational angle $\theta$ of 0° (angle to OV-OV'), namely, under the condition that the detection portion 510 was positioned directly above the IC tag 100 in the structure shown in FIG. 8A, the detection portion 510 could reliably detect the IC tag 100. With the rotational angle $\theta$ of 180°, namely, in the structure shown in FIG. 8B, however, the detection portion 510 could not detect the IC tag 100. Further, with the rotational angle $\theta$ of ±90°, namely when the detection portion was positioned at a right angle to OV-OV', the detection portion 510 could not detect the IC tag 100. The detection experiment results indicate that the detection portion 510 can reliably pinpoint and detect the IC tag 100 when positioned at the predetermined position opposed to the IC tag.

According to the embodiment, the IC tag is embedded in the insulating layer of the igniter assembly just in case any failure should be detected from a completed igniter assembly. The IC tag provides for the acquisition of the information, based on which the cause of the failure can be analyzed or the range of the failure can be determined.

According to the embodiment, the IC tag is embedded in the igniter assembly including the metallic shield vessel and the space for connecter connection in the metallic shield vessel is put to use for detecting the IC tag. Even after the igniter assembly is mounted in the vehicle body, therefore, the IC tag information corresponding to each igniter can be externally detected by the IC tag communication reader/writer 500 in an efficient manner without affecting the characteristics of the igniter assembly. Further, the reversed insertion of the conductive pins of the ignition circuit can be externally detected from a single unit of completed igniter assembly in an efficient manner without affecting the characteristics of the electric components thereof such as the bridge wire 205 and the ignition charge 204.

The IC tag communication reader/writer 500 does not need to have an integral structure. For example, the individual components, such as the signal transmission portion T 511 to the IC tag, may be discretely formed and interconnected with cables or electromagnetically, wirelessly interconnected. In this case, the IC tag communication reader/writer 500, which is not shown, includes the main body with an IC tag communication reader/writer antenna, and a dipole antenna independent from the main body and including the signal transmission portion and the detection portion. The same electromagnetic wave as the electromagnetic wave for IC tag communication is used for communication between the main body and the dipole antenna. The dipole antenna is provided with the positioning portion conforming to the concavo-convex structure of the igniter 200.

According to an assembly method for the gas generator 300 adopting the embodiment, the igniter assembly is assembled to the gas generator 300 after the acquisition of the specific identification information, such as ID number, specific to the igniter as well as the determination of the positional relation of the first conductive pin P1 and the second conductive pin P2 in the igniter assembly. After determination is thus made on whether or not the insertion of the two conductive pins in the gas generator is correct, the gas generator is assembled to the well-known automobile safety device (e.g., a pretensioner for seat belt retractor) and then is further incorporated in the air bag device (e.g., a pretensioner for seat belt). Thus, the airbag device is mounted in the vehicle. The distinction method of the embodiment permits the two conductive pins of the igniter assembly to be distinguished easily at a lower cost than the prior art method. Therefore in the assembling work of the automobile safety device such as the airbag apparatus (an airbag gas generator) and the seat belt pretensioner, the device can be assembled without making an error of reversely connecting the two conductive pins but making sure that the conductive pins are correctly connected to the proper electrodes of the ignition power source. Hence, the reliability on these devices can be improved. It is noted that the distinction method of the present invention is also applicable to an igniter and an igniter assembly which include three or more conductive pins.

Fourth Embodiment

Next, a fourth embodiment of the present invention is described.

The positioning portion of the igniter assembly according to the present invention is not limited to the mechanical structure designed to fix the positional relation. The fourth embodiment adopts an optical detecting mechanism.

The means for fixing the relative positional relation between the igniter assembly and the IC tag communication reader/writer is not limited to the mechanical structure, which may be replaced by an optical detection structure. In this structure, for example, it may be arranged that a detection mark as the positioning portion for the IC tag communication reader/writer is attached to a surface of the flange 309 shown in FIG. 1B, the detection mark is detected with a camera mounted to the IC tag communication reader/writer, and the image of the detection mark is processed to determine the relative positional relation.

For example, the detection mark as the positioning portion for the IC tag communication reader/writer is attached to the surface of the flange 309 of the igniter assembly. The reader/writer device or the igniter assembly is placed on a table movable based on the XY coordinates or on a robot arm. The detection mark of the positioning portion is detected with the camera mounted to the IC tag communication reader/writer. The image of the mark is processed to determine the relative positional relation between the igniter assembly and the reader/writer device so as to exactly position the reader/writer device and the igniter assembly. Subsequently, the reversed insertion is detected the same way as in the first embodiment.

According to this embodiment, the IC tag is embedded in the igniter assembly at the predetermined position so as to provide for the contactless, efficient detection of the reversed insertion of the conductive pins which is performed from outside without affecting the characteristics of the igniter assembly.

LIST OF REFERENCE SIGNS

100: IC tag
101: IC chip
102: Coil antenna
200: Igniter
201: Charge holder
202: Header
203: Plastic cover
204: Ignition charge (ignition agent)
205: Bridge wire
206: First conductive pin (P1)
207: Second conductive pin (P2)
209: Eyelet
300: Gas generator
301: Transfer charge
302: Gas generating agent mold
303: Gas discharge port
305: Igniter collar (metallic shield vessel)
306: Connector insertion space
309: Annular flange for retaining metallic shield vessel
310: Positioning portion
312: Resin mass
315: Hole
316: Hole
500: IC tag communication reader/writer
503: Engagement portion
510: Detection portion
h: Predetermined depth

The invention claimed is:

1. An igniter comprising:
a heating element;
an ignition agent disposed in contact with the heating element;
a conductive pin penetrating an insulating layer, having a first end electrically connected to the heating element, and a second end exposed from the insulating layer in order to be connected with a current supply component for supplying an ignition current to the heating element; and
an IC tag disposed in the insulating layer and in a vicinity of the conductive pin,
wherein the IC tag includes an IC chip and a coil antenna wound around the IC chip, and
wherein the IC tag has a surface of the coil antenna positioned at a right angle or an approximate right angle with respect to the conductive pin.

2. The igniter according to claim 1,
wherein the igniter is an igniter for instantaneously deploying a vehicle occupant restraint apparatus.

3. An igniter assembly comprising:
an igniter integrated with an igniter collar,
the igniter including:
a heating element;
an ignition agent disposed in contact with the heating element;
a first conductive pin penetrating an insulating layer, having a first end electrically connected to the heating element, and a second end exposed from the insulating layer in order to be connected with a current supply component for supplying an ignition current to the heating element; and
an IC tag disposed in the insulating layer and in a vicinity of the first conductive pin,
wherein the IC tag includes an IC chip and a coil antenna wound around the IC chip, and
wherein the IC tag has a surface of the coil antenna positioned at a right angle or an approximate right angle with respect to the first conductive pin.

4. The igniter assembly according to claim 3, further comprising:
a second conductive pin electrically connected to the first conductive pin by a bridge wire,
wherein the IC tag is disposed in the insulating layer and in the vicinity of the first and second conductive pins; and
wherein the igniter collar surrounds the insulating layer and retains the igniter assembly and the igniter collar is provided with a positioning portion at a position corresponding to the IC tag.

5. The IC tag incorporated igniter assembly according to claim claim 4,
wherein the positioning portion is a concavo-convex structure which is disposed at a flange of the igniter collar and extends perpendicularly to an axis passing through the center of first and second conductive pins.

6. The IC tag incorporated igniter assembly according to claim 4,
wherein the positioning portion is a detection mark which is disposed at a flange of the igniter collar in order to be detected by an optical detecting mechanism.

7. A detection system comprising:
an IC tag communication reader/writer; and
an igniter assembly including:
a metallic shield vessel,
an igniter fixed in the metallic shield vessel,
wherein the igniter includes:
a heating element,
a plurality of conductive pins, each having a first end thereof electrically connected to the heating element via an insulating layer and a second end thereof extending in a connection space in the metallic shield vessel for connection to a current supply component, and an IC tag disposed in the insulating layer and in a vicinity of any one of the plurality of conductive pins, and wherein the connection space is a window through which the IC tag is detected by the IC tag communication reader/writer, wherein the IC tag includes an IC chip, and a coil antenna wound around the IC chip, and wherein the IC tag has a surface of the coil antenna positioned at a right angle or an approximate right angle with respect to at least one of the conductive pins.

8. The detection system for igniter assembly according to claim 7, wherein the metallic shield vessel is provided with a positioning portion for the IC tag communication reader/writer at a position corresponding to the IC tag, wherein the IC tag communication reader/writer includes an antenna circuit for emitting electromagnetic waves for IC tag communication, an engagement portion, and a detection portion, wherein a coil of the detection portion is in parallel to the surface of the coil antenna of the IC tag in a state where the engagement portion of the IC tag communication reader/writer is matched with the metallic shield vessel, wherein the detection portion and the IC tag are electromagnetically coupled via magnetic flux when the detection portion and the IC tag are fixed at places within a predetermined distance, and wherein, when the detection portion and the IC tag are fixed at places spaced more than the predetermined distance, the detection portion and the IC tag are outside a detectable range via the magnetic flux.

9. The detection system for igniter assembly according to claim 8, wherein the IC tag communication reader/writer further includes an antenna circuit disposed in a main body thereof, wherein the detection portion is integrally disposed at a distal end of the main body, wherein the detection portion is connected to a signal transmission portion that extends outwardly from the distal end of the main body, wherein the detection portion is configured as a detecting coil perpendicular to an axis of the signal transmission portion, and wherein the detection portion is fixed at a predetermined position in the connection space by mechanically mating the engagement portion with the positioning portion.

10. The detection system for igniter assembly according to claim 8, wherein the IC tag communication reader/writer includes:
a first antenna circuit disposed in a main body thereof;
a second antenna circuit, a signal transmission portion and a detection portion which are integrally provided as a member separated from the main body; and
wherein the engagement portion is disposed at the second antenna circuit, wherein the coil of the detection portion is perpendicular to an axis of the signal transmission portion, and the detection portion is fixed at a predetermined position in the connection space by mechanically mating the engagement portion with the positioning portion.

11. An igniter assembly detection method comprising:
providing an igniter assembly including a metallic shield vessel having a positioning portion and an igniter fixed in the metallic shield vessel, the igniter including:
a heating element;
a plurality of conductive pins, including a first conductive pin having a first end electrically connected to the heating element via an insulating layer and a second end extending in a connection space in the metallic shield vessel, and
an IC tag disposed in the insulating layer and in a vicinity of any one of the plurality of conductive pins;
providing an IC tag communication reader/writer including an antenna circuit emitting electromagnetic waves for IC tag communication, and a detection portion;
setting the IC tag communication reader/writer in the metallic shield vessel; and
detecting the IC tag by utilizing the connection space as a window.

12. The igniter assembly detection method according to claim claim 11, further comprising:
setting the IC tag communication reader/writer to the positioning portion of the metallic shield vessel;
determining that the conductive pins are connected to the igniter at normal positions, when electromagnetic coupling between the detection portion and the IC tag via magnetic flux is detected; and
determining that the conductive pins are not connected to the igniter at normal positions, when the electromagnetic coupling between the detection portion and the IC tag via magnetic flux cannot be detected.

13. The igniter assembly detection method according to claim claim 12,
wherein the IC tag includes an IC chip, and a coil antenna wound around the IC chip,
wherein the IC tag has a surface of the coil antenna positioned at a right angle with respect to the conductive pin, and
wherein the IC tag performs communication with the IC tag communication reader/writer by inducing information on the IC tag inversely from a secondary current to a high-frequency primary current, when the IC tag is energized by inducing the secondary current from the high-frequency primary current.

14. The igniter assembly detection method according to claim 12, further comprising:
performing IC tag communication with the IC tag by electromagnetically coupling the detection portion to the IC tag via magnetic flux, when the IC tag communication reader/writer is matched with the metallic shield vessel, a coil of the detection portion is in parallel to a coil surface of the IC tag, and when the detection portion and the IC tag are fixed at places within a predetermined distance.

* * * * *